Dec. 25, 1962  A. M. MARKS ET AL  3,069,974
MULTI-LAYERED LIGHT POLARIZERS
Filed Nov. 12, 1959  4 Sheets-Sheet 1

INVENTORS
ALVIN M. MARKS
BY MORTIMER M. MARKS

ATTORNEY

INVENTORS
ALVIN M. MARKS
MORTIMER M. MARKS

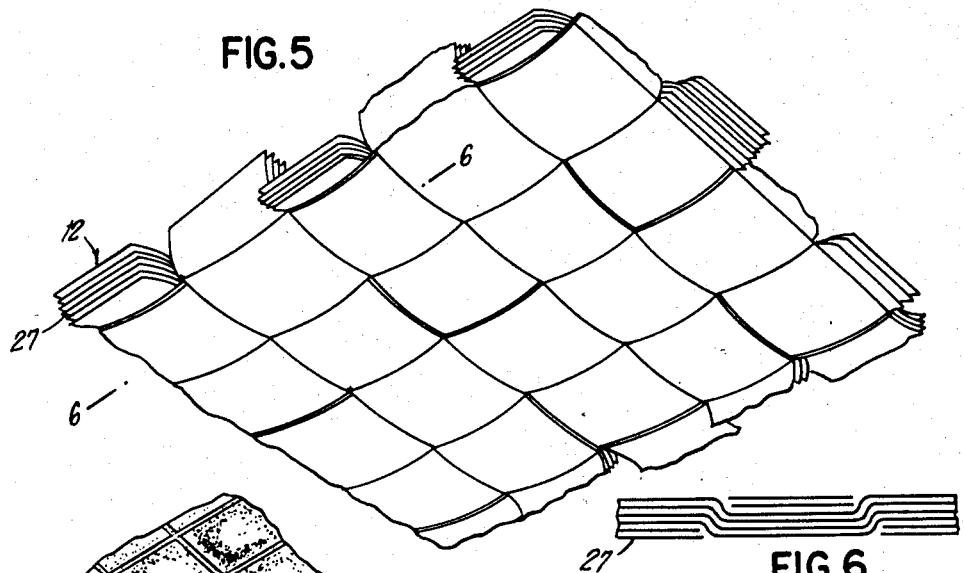
FIG.5
FIG.6
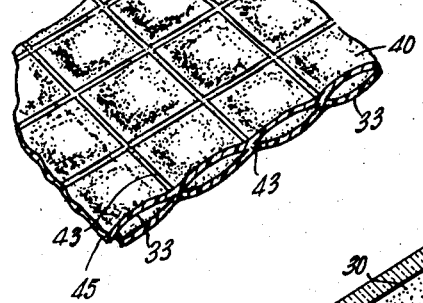
FIG.8
FIG.7
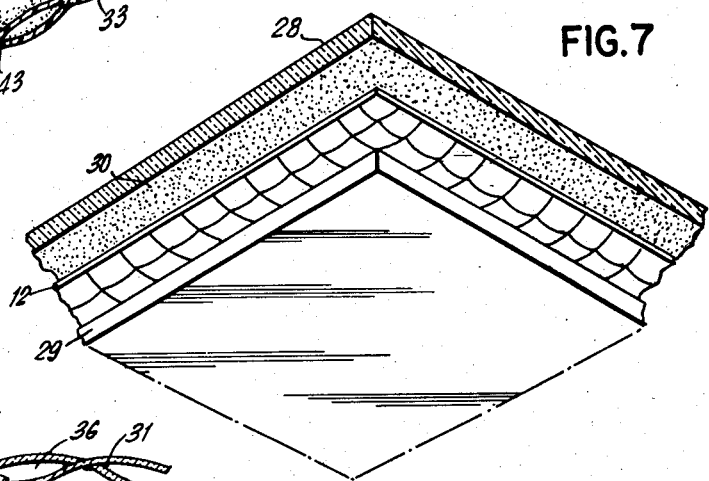
FIG.9
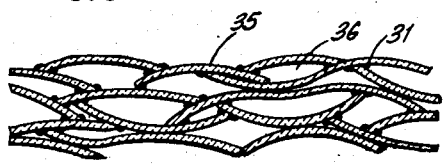
FIG.10
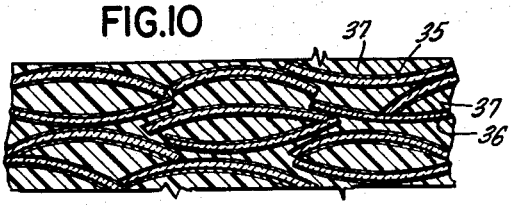

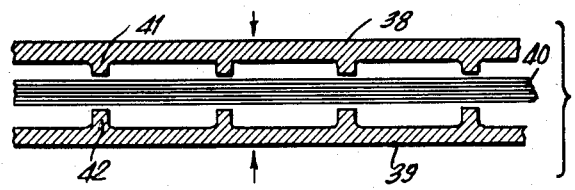
FIG. 11
FIG. 12
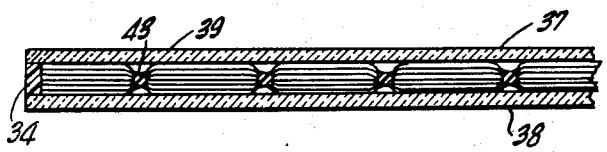
FIG. 13
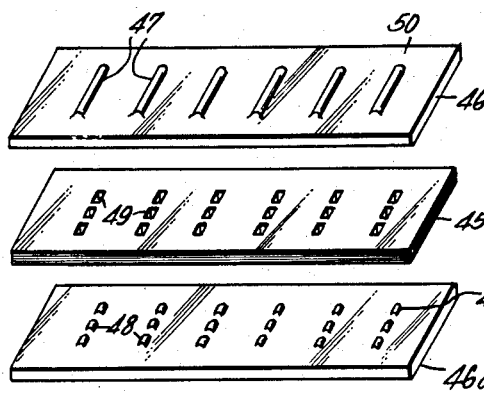
FIG. 14
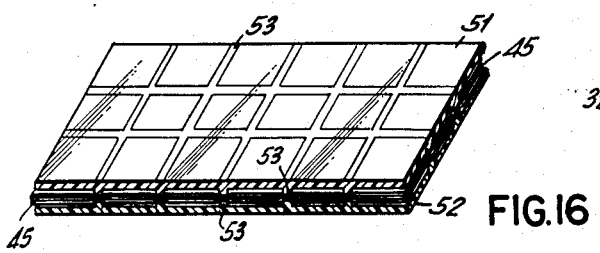
FIG. 15
FIG. 16
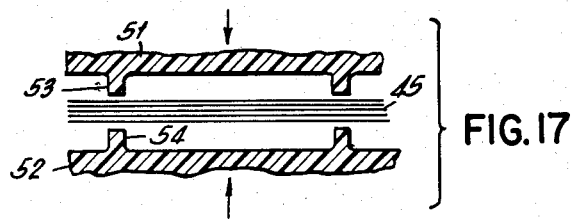
FIG. 17
INVENTORS
ALVIN M. MARKS
MORTIMER M. MARKS
BY Albert F. Krouman
ATTORNEY United States Patent Office 3,069,974
Patented Dec. 25, 1962

3,069,974
MULTI-LAYERED LIGHT POLARIZERS
Alvin M. Marks, 149–61 Powells Cove Blvd., and Mortimer M. Marks, 166–25 Cryders Lane, both of Whitestone, N.Y.
Filed Nov. 12, 1959, Ser. No. 852,410
4 Claims. (Cl. 88—65)

This invention relates to the production of radial polarized illumination and specifically such as will eliminate specular glare, increase contrast, color saturation, and visual acuity.

Where polarized illumination has been produced by the use of the multi-layer type polarizer, consisting of a plurality of transparent elements, disposed in parallel relationship and having sharply different indices of refraction between adjacent members, a small portion of the light rays emitted in the range of zero to 25° from the vertical. This small circle of light therefore produced a small amount of undesirable glare or specular reflection at approximately 25° in the area where persons would normally be working at specific visual tasks, as shown in United States Patent 2,402,176.

It is known that when working at specific visual tasks, the line of sight from the eye of the observer to the task area is usually about 25° to the vertical. Specular reflection to the eye of the observer tends to reduce visibility from light directed downwardly at approximately this angle.

Accordingly, it is an object of the present invention to provide a multi-layer type of polarizer which will substantially suppress all light rays coming from all directions about the vertical between the angles of 0 to 45°, and 70° to 90°.

A further object of the present invention is to provide a multi-layer polarizer which transmits substantially only polarized light within a specific range of angles, and reflects internally all other light.

Still another object of the present invention is to provide a polarizer having no transmission to the range of 70° to 90° thereby eliminating direct ceiling glare.

An object of the present invention is to provide a luminous ceiling panel in which a circle or halo of polarized light will be transmitted to every point below the said panel.

Another object of the present invention is to provide a multi-layer light polarizing panel in which the light distribution curve may be controlled by the selective use of a desired number of layers of material having different indices of refraction.

A feature of one form of the present invention is its use of a woven multi-layer plastic structure to provide the desired type of general polarized illumination.

Another feature of the present invention is the use of embossings in the surface structure of plastic sheets to form a multi-layer polarizer.

Still another feature of the present invention is its use of a selected number of layers of thin flakes of glass in parallel orientation spaced from each other by air or a suitable plastic, said glass and adjacent material having different indices of refraction.

The invention consists of the construction, combination and arrangement of parts, as herein illustrated, described and claimed.

In the accompanying drawings, forming a part hereof are illustrated several forms of embodiment of the invention and in which:

FIGURE 5 is a view in perspective of a portion of a multi-layer polarizer, somewhat enlarged, made in accordance with the present invention illustrating the manner in which layers of plastic may be woven to form a polarizing panel.

FIGURE 6 is a sectional view taken on line 6—6 of FIGURE 5.

FIGURE 7 is a somewhat exploded view illustrating the manner in which the woven strips may be secured together to form a polarizing panel.

FIGURE 8 is a fragmentary view somewhat enlarged of a portion of a light polarizing panel according to another embodiment of the present invention.

FIGURE 9 is a cross sectional fragmentary view greatly enlarged of another light polarizing structure made in accordance with the present invention employing a plurality of glass flakes separated from each other by air spaces, said flakes being disposed in parallel relationship to one another.

FIGURE 10 is a cross sectional fragmentary view greatly enlarged of a multi-layer polarizer formed of a plurality of coated glass flakes embedded within a transparent matrix, and said coatings on the glass flakes having sharply different indices of refraction.

FIGURE 11 is a fragmentary cross-sectional view of a die structure and plurality of thin plastic sheets showing the manner in which light polarizing panels can be manufactured.

FIGURE 12 is a fragmentary cross sectional view of the multi-layer polarizer made by the apparatus of FIGURE 11.

FIGURE 13 is a fragmentary cross sectional view of a multi-layer polarizer incorporated into a rigid panel structure.

FIGURE 14 is a somewhat exploded view of a further form of a light polarizing panel according to the present invention.

FIGURE 15 is a fragmentary cross sectional view of an assembled panel such as is illustrated in FIGURE 14.

FIGURE 16 is a view in perspective of a portion of a light polarizing panel made in accordance with the present invention.

FIGURE 17 is a somewhat exploded cross sectional fragmentary view of the panel shown in FIGURE 16.

Figure 1:
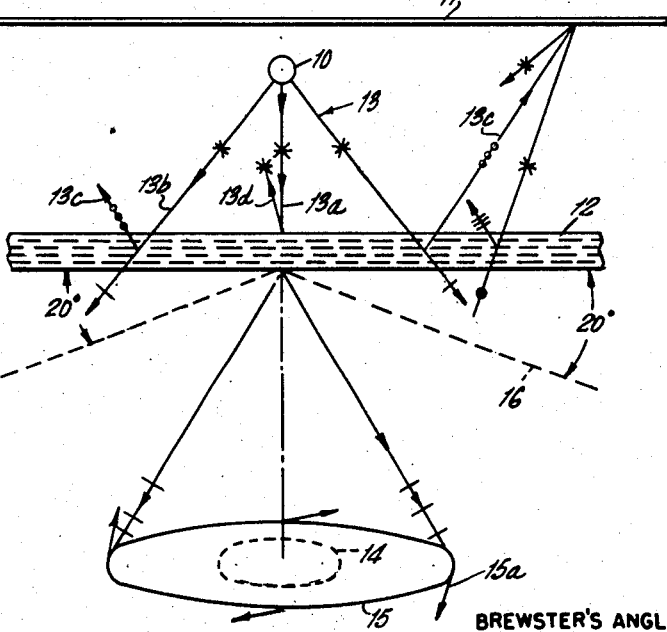
FIGURE 1 is a somewhat diagrammatic view showing the various paths of light as it is refracted, transmitted, and reflected by a multi-layer polarizing structure.

Referring to the drawings and specifically to FIGURE 1, 10 indicates a source of illumination such as a fluorescent or incandescent bulb. A light reflecting depolarizing surface such as a ceiling 11 extends above the light source. A multi-layer polarizing member 12 made in accordance with one of the hereinafter described structures is disposed beneath the light source 10.

Rays 13, 13a, 13b, etc., emitted by the light source 10 are directed towards the multi-layer polarizer 12, and are converted into reflected, and transmitted polarized light, or reflected unpolarized light depending upon the angle at which they strike the multi-layer polarizer 12. As shown in FIGURE 1, ray 13a which is directed along a path substantially normal to the polarizer 12 will traverse the polarizer and not be polarized by it. In previously known multi-layer polarizers, the small cone of downward light in the 0 to 25° range has heretofore been substantially unpolarized, forming a small circle of unpolarized light generally indicated at 14 in FIGURE 1, which light, contains objectionable glare component for viewing specific tasks. The rays 13 and 13b which are directed at the polarizer at an oblique angle of between 45° to 70°, are transmitted and reflected by the polarizer 12. The transmitted light appears below the polarizer 12 as almost completely radially polarized light generally indicated by the circle 15 in FIGURE 1 and is polarized with the plane of polarization 15a always tangent to the transmitted light of circle 15.

As used herein the term "radially polarized light" means light which is plane polarized at right angles to the plane of incidence, which planes of incidence are in all directions about a given point. The plane polarized ray is thus always in a position to refract into surfaces below the radial polarizer regardless of the direction of the ray.

A certain portion of the ray 13b is reflected from the polarizer 12 as indicated at 13c in FIGURE 1. The reflected ray 13c is directed at the reflective surface 11, depolarized and once again sent towards the polarizer 12. In this manner, a large percentage of the light emitted by the source of illumination 10 eventually traverses the polarizer 12 and emerges as usable polarized light upon the surface 16 therebelow. This action which is hereinafter termed reflux polarization results in lighting efficiencies of about 70%. Because of the nature of multi-layer polarizers, light which reaches the polarizer 12 at an angle in excess of 70° is totally reflected internally by the polarizer 12 giving a low brightness effect when viewed from beneath at an angle of 0° to 20° to the horizontal.

It has been found that by the proper selection of the number of layers used in the multi-layer polarizer and of the materials of suitable indices of refraction all light transmitted in the 0 to 45° area, can be eliminated. The transmission factor of the approximately normal ray 13a is reduced practically to zero and replaced by a very high internal reflectance indicated by the ray 13d. The transmission and polarization of an oblique ray such as 13b is favored.

Figure 2:
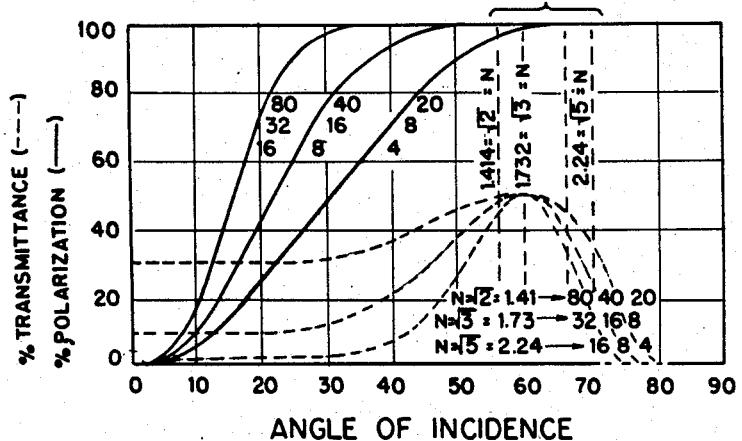
FIGURE 2 is a graph showing the calculated curves illustrating the behavior of various multi-layer type polarizers having a specific number of layers and designated relative indices of refraction.

Referring to FIGURE 2 there is shown a graph based on Fresnel's equations, for multi-layer polarizers with various numbers of layers and various relative indices of refraction, assuming no absorption. The curves of the graph show that the transmitted light at normal or zero degrees may be reduced almost to zero by at least 80 layers of index 1.41 material, 32 layers of 1.73 material, or 16 layers of index 2.24 material. It will be apparent from an examination of the graph that the peak transmission at Brewster's angle is 50% (assuming no absorption losses) regardless of the number of layers or the index of refraction.

At any given index of refraction the percent of polarization curve shown in FIGURE 2 rises more rapidly using a greater number of layers. Thus, for example, to obtain at least 95% polarization of light at 30° or more it is possible to use 80 layers of material of relative index 1.41, 32 layers of relative index 1.73 or 16 layers of relative index 2.24. 95% polarization is obtained at 57° or more with 20 layers of material having a relative index of 1.41, 8 layers of material of relative index 1.73 or 4 layers of relative index 2.24 material.

It will be noted from an examination of FIGURE 2 that the Brewster's angle shifts from 54° at a relative index 1.44 to 57° at a relative index 1.50 to 60° at a relative index 1.73, and to 67° with a relative index at 2.24.

For general illumination it is preferred to use materials such as glass or plastic which have a relative index of refraction of approximately 1.50. This index corresponds to the same index, namely, 1.50 for paper, wood, glass, and other most commonly viewed objects.

Figure 3:
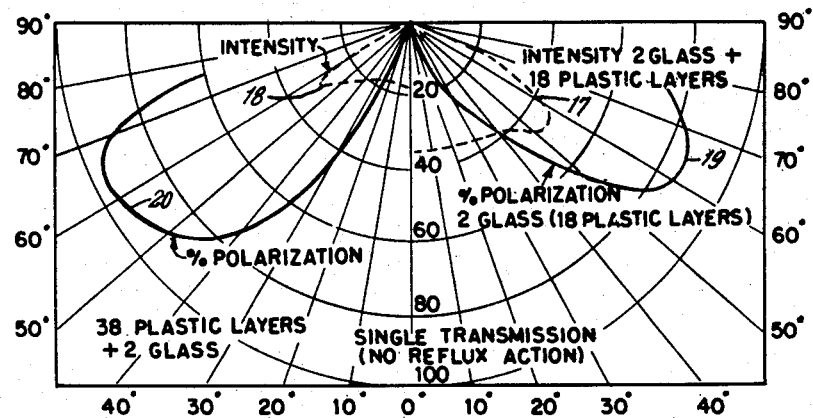
FIGURE 3 is a polar graph showing percent transmission and percent polarization of light vs. angle of incidence for multi-layer plastic polarizers supported by glass, without reflux action.

In FIGURE 3 there is shown in a polar graph the control of light distribution by the employment of a specific number of layers of material of about 1.50 relative index of refraction. In FIGURE 3, curve 17, shows the light distribution pattern of a multi-layer polarizer employing 18 thin plastic layers, plus 2 sheets of glass, totaling 20 layers, having a relative index of approximately 1.5, alternating with air, of index approximately 1.00 for transmitted light only (no reflux polarization). The plastic layers employed are thin (.001 inch). Although many suitable materials may be employed it has been found, rigid isotropic cast cellulose triacetate sheeting, which is free from strain, produces exceptionally excellent results. The acetate sheets may be supported between thick glass or isotropic plastic supporting layers.

Curve 18 shows the light distribution curve for the same structure but using 38 thin plastic layers and 2 sheets of glass totaling 40 layers. An increase in the number of layers is effective in increasing the ratio of transmission at Brewster's angle relative to the transmission at normal incidence in the case of curves 17 and 18, from 1.27 to 1.61. With a sufficient number of layers it is possible to suppress normal transmission almost entirely, while permitting substantial transmission at Brewster's angle. Curves 19 and 20 in FIGURE 3 are the corresponding curves showing polarization vs. angle for the 20 and 40 layer polarizers respectively. When the reflux action is used the transmission efficiency of the 45–70° range with a peak of 57° is greatly increased, particularly with a good depolarizing ceiling reflector of high reflectivity, such as pure magnesium oxide, MgO. The effect of increasing the number of layers is to increase the percentage of polarization at small angles of incidence and to broaden the angular distribution of polarization, that is to increase the percentage of polarization at all angles of incidence except at zero degrees, and to substantially restrict all light transmission to the 45–70° angular range, with a peak at Brewster's angle of 57° for a relative index of refraction of 1.50.

Figure 4:
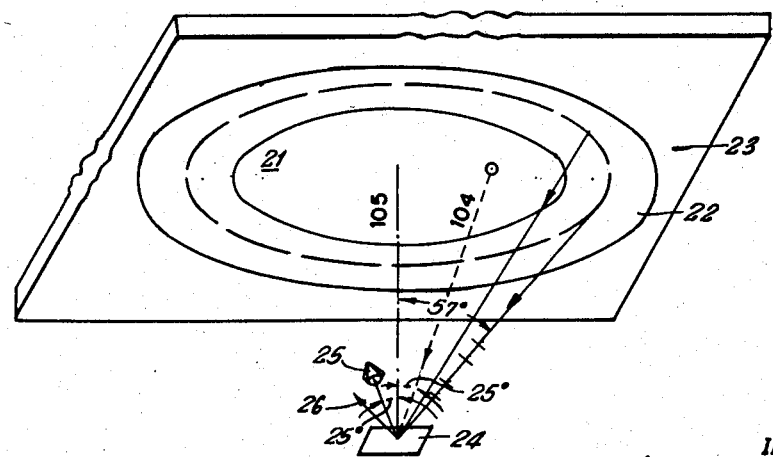
FIGURE 4 is a somewhat diagrammatic illustration of the effect produced by polarizers made in accordance with the present invention.

In FIGURE 4 there is illustrated a portion of a ceiling panel equipped with a sufficient number of layers to produce the "polarized halo effect." By the term "polarized halo" is meant an effect whereby the area indicated at 21 in FIGURE 4, which is directly above the head of the observer will appear dark or substantially darker than a surrounding area shown at 22. The area 23 beyond the bright area will again be one of low brightness to the observer looking upwardly, at the panel or ceiling. The halo of polarized light 22 will follow and surround the observer no matter where he may be in the room. This is a novel and unexpected result. The light from the halo 22 proceeds as an inverted cone of substantially completely polarized light to the surface 24 which is being viewed by the observer indicated by the eye 25 in FIGURE 4. Rays near 57° will be refracted into the surface 24 and very high contrast which results in highly desirable visual acuity is realized. The small component of residual specular glare will be reflected as beam 26 at angles of reflection equal to about 57° and thus will avoid contact with the observer's eye 25, since the eye of a person working at a desk or table tends to pick up reflections mostly at 25°.

It has been found that the rings or halo of polarized light 22 are more sharply defined as the number of the layers of the multi-layer polarizers are increased. If an index of refraction of 1.5 is used, for example, above 35 layers of material having differing indices of refraction there is noticeable reduction of intensity in the central area 21 immediately above the observer. With 50 of these layers there is still some light coming from the central areas 21 but it is greatly reduced. When 200 layers are used there is too great a light loss for suitable illumination purposes. When 100 layers are employed there is only a faint amount of light reaching the surface 24 from the area 21. Above 100 layers substantially complete extinction of the near normal incident rays such as 13a will be achieved. At angles of 45° through 70° light will be totally polarized and will be transmitted by the multi-layer polarizer. It will be observed that the light striking the multi-layer polarizer at oblique angles of 45°–70° is favored in transmission through the polarizer whereas light striking the polarizer at 0–45° angles and 70°–90° angles, will be totally internally reflected back to the ceiling surface 11. The reflected rays are refluxed, and with the efficient depolarizing reflections, eventually exit as polarized halo light.

A small change in surface reflectivity at 11 will result in a large change in brightness of the halo. Therefore, a high reflectivity of the reflector 11 above the multi-layer polarizer is extremely important. It is necessary to get above 80% to 85% of reflectivity in order to provide a satisfactory output of transmitted light through the halo-multi-layer polarizer. Reflective surfaces suitable for the above purposes may be high quality magnesium oxide reflective diffusing, coatings or the like. A metal reflector may be used with an intervening depolarizing surface.

Referring to FIGURE 5 there is shown one form of mulit-layer polarizer made in accordance with the present invention.

The polarizer 12 is composed of at least 80 layers of material having an index of 1.41, or 70 layers of material having an index of 1.50, or 32 layers of material having an index of 1.73, or 16 layers of index to 2.24 material. Material suitable for this purpose may consist of cellulose triacetate, cellulose acetate, butyrate, acrylic material such as methylmethacrylate and other suitable isotropic plastic sheet materials which have indices of about 1.50. Thin transparent sheets or flakes of glass having a thickness of .0002″ to .002″ may also be used. The isotropic plastic material is preferably of a thickness of .0002″ to .002″ and must be highly transparent, that is, substantially free from absorption. The surfaces of the plastic should be as smooth and as free from irregularity as possible.

In one form of this invention the plastic or glass material is cut into long strips and woven in the manner shown in FIGURE 5. Each strand of woven material consists of a plurality of layers as indicated at 27 in FIGURES 5 and 6, so that the entire structure presents a multi-layered assembly having an overall woven appearance which imparts certain properties of uniformity and a highly pleasing pattern thereto.

The woven assembly is preferably sandwiched between two supporting sheets 28, 29, as shown in FIGURE 7. The edges of the sandwich 12 may be fused together or sealed in order to prevent moisture or dust from entering the assembly. Supporting sheets 28 is provided with a light depolarizing layer 30 on one face thereof or may be sandblasted to give a light diffusing effect. Supporting sheet 29 is preferably transparent. The sheets 28, 29, are brought together on each side of the polarizer 12, in FIGURE 7 to make a unitary structure having the property of polarizing light incident thereon as hereinabove more fully described.

In FIGURE 8 there is shown a plurality of layers of plastic 40, joined together in a suitable grid pattern, by heat sealing the layers at 43 as shown in FIGURES 11 and 12. The die members 38 and 39 in FIGURE 11 press against layers 40 forming a solid grid pattern shown in FIGURE 8. The sheet so formed is self improving and the air pockets 33 entirely sealed. The die members 38 and 39 may be heated and thermostatically controlled to such temperatures as to cause fusion of the plastic layers 40, at the places where the raised portions 41, 42 meet. The pressure on the dies 38, 39, is regulated to cause coalescence of the layers 40 without excessive flow distortion.

In FIGURE 9 there is shown a fragmentary portion of a light polarizing panel made in accordance with the present invention in which a large number of glass flakes are disposed in random orientation but in general parallel disposition to each other and sealed together at their meeting edges by means of some adhesive or suitable plastic material. The flakes 35 are spaced from each other by flat air spaces 36 which are entrapped therebetween. With a suitable number of layers of glass flakes 35 it has been found possible to provide the halo polarizing effect hereinabove described. As a specific example of a glass flake polarizer which will act as a halo polarizer it has been found that at least 80 layers of glass flakes having an index of 1.50 and having air spaces entrapped therebetween secured together at their meeting edges 31 and cast into a continuous sheet will satisfy the requirements of a halo polarizer.

In FIGURE 10 there is shown a fragmentary cross section of a light polarizing panel made in accordance with the present invention consisting of a plurality of glass flakes 35 having a coating 36a made of a high index material such as titanium dioxide on each side thereof, the whole being embedded in a plastic matrix 37 which plastic has a sharply lower index of refraction than the titanium dioxide coatings 36a. It has been found that with at least 20 layers of titanium dioxide coated flakes embedded in a plastic 37 said glass and plastic having an index of refraction of 1.5, the halo effect can be achieved.

In connection with FIGURE 8 it is preferred that the total area of the fused grid portions 43 comprise only a small part of the order of 2 to 5% of the total area of the sheet inasmuch as the light passing through the fused grids will not be polarized but will be ordinary light.

Similarly, the woven structure illustrated in FIGURES 5, 6, and 7, should be tightly woven to minimize light passing between the strands thereof which light, of course, will not be polarized light. In the embodiment shown in FIGURES 9 and 10, there is no problem of light traversing the panels as unpolarized light.

When a sufficient number of layers, such as from 100 to 150 layers of isotropic material, are employed having a thickness of .0002 to .002″ and an index of refraction of 1.5 almost 98% of the light traversing the panels will be polarized, and will be emitted in the form of a halo, in an inverted cone as shown in FIGURE 4.

The halo effect can be achieved using materials having a wide variety of indices of refraction providing the number of layers employed is such that the product of the relative index of refraction of the material squared less 1, times the number of layers equals at least 60 or: $L(N^2-1) \cong 60$, when $N=$ the relative index of refraction, $L=$ the number of layers.

The polarizing panel illustrated in FIGURE 12 may be further supported between glass plates 37a, 38, as illustrated in FIGURE 13 to form a rigid uniform light polarizing panel. The upper glass plate 37a may be provided with a light diffusing surface 39 and the lower glass plate is preferably transparent. The entire assembly shown in FIGURE 13 may be sealed around the edges as shown at 34 to prevent the entrance of foreign material into the assembly.

In the embodiment shown in FIGURES 14 and 15, the outer support members consist of sheets of isotropic, strain free, cast vinyl material or the like, forming a supporting structure 46, 46a, having embossings 47, 48 thereon, such that the upper embossings 47 will receive the lower embossing 48 therein. The multi-layer sheets 45 are stamped or otherwise provided with a plurality of holes 49 into which the lower embossings 48 fit. When the entire sandwich is assembled as shown in the fragmentary view of FIGURE 15, the embossings 47, 48 will lock together and retain the multi-layer sheets 45 therebetween in flat parallel alignment. Flat air spaces 32 will be entrapped between the multi-layer sheets 45 thereby providing the sharp difference in indices of refraction necessary to provide the multi-layer polarizing effect.

The multi-layer sheets 45 may consist of any number of cellulose triacetate sheets, for example, 15 to 25 layers for ceiling panels for ordinary illumination and 60 to 150 layers for producing polarized lighting having the halo effect. The supporting sheets 46, 46a may be of a thickness of .030" to .050" and of water-white, rigid strain-free plastic material. The upper surface 50 of the top sheet 46 may be provided with a light diffusing surface such as that indicated at 39 in FIGURE 13. The entire sandwich may be secured together by electronic welding, as indicated at 44, a suitable adhesive, or the like. When finished the structure will provide a self-supporting multi-layer polarizing panel of high polarizing efficiency.

In FIGURES 16 and 17 there is shown a multi-layer polarizing structure in which the top and bottom supporting panels 51, 52 are provided with matching ridges 53, 54. The ridges 53, 54 may form a grid such as indicated at 53 in FIGURE 16 or any other attractive pattern which will support the multi-layer polarizing sheets 45 over the entire structure at suitable intervals as shown in FIGURE 17.

When the structure is assembled as illustrated in FIGURE 17, the ridges 53, 54 and sheets 45 are held together by the rigidity of the outer embossed sheets 51 and 52 to form the structure shown in FIGURE 16.

Having thus fully described the invention, what is claimed as new and desired to be secured by Letters Patent of the United States is:

1. A structure for converting randomly vibrating light into radially polarized light comprising in combination with a light diffusing surface spaced from and above a polarizing element said polarizing element comprising a plurality of layers of thin isotropic material disposed in substantially parallel alignment and spaced from each other, said layers forming a planar structure of sufficiently large area to subtend an inverted cone the apex of which is equal to Brewster's angle at the eye level of one standing beneath said structure and being of a number and having an index of refraction such that the product of their relative index of refraction N squared less 1, times the number of layers L equals at least 50 or: $L(N^2-1) \geq 50$ whereby light rays incident thereon at between 0° to 45° and 70° to 90° will be almost totally reflected and light rays incident thereon between 40° and 70° will be refracted and substantially transmitted as radially polarized light.

2. A structure converting randomly vibrating light into radially polarized light comprising in combination with a light diffusing surface spaced from and above a polarizing element said polarizing element comprising a least 40 and and not more than 200 thin layers of an isotropic material having a relative index of refraction between 1.41 and 1.7, said layers forming a planar structure of sufficiently large area to subtend an inverted cone the apex of which is equal to Brewster's angle at eye level of one standing beneath said structure and being disposed in spaced substantially parallel orientation whereby light rays incident thereon at between 0° to 45° and 70° to 90° will be substantially totally reflected and light rays incident thereon between 40° and 70° will be reflected and refracted and substantially transmitted as radially polarized light.

3. A structure for converting randomly vibrating light into radially polarized light comprising in combination with a light diffusing surface spaced from and above a polarizing element said polarizing element comprising a plurality of layers of thin isotropic material disposed in substantially parallel alignment and spaced from each other, said layers forming a planar structure of sufficiently large area to subtend an inverted cone the apex of which is equal to Brewster's angle at the eye level of one standing beneath said structure and being of a number and having an index of refraction such that the product of their relative index of refraction N squared less 1, times the number of layers L equals at least 60 or: $L(N^2-1) \geq 60$, whereby light rays incident thereon at between 0° to 45° and 70° to 90° will be almost totally reflected and light rays incident thereon between 40° and 70° will be refracted and substantially transmitted as radially polarized light.

4. A structure for converting randomly vibrating light into radially polarized light comprising in combination with a light diffusing surface spaced from and above a polarizing element said polarizing element comprising a plurality of layers of thin isotropic material disposed in substantially parallel alignment and spaced from each other, said layers forming a planar structure of sufficiently large area to subtend an inverted cone the apex of which is equal to Brewster's angle at the eye level of one standing beneath said structure and being of a number and having an index of refraction such that the product of their relative index of refraction N squared less 1, times the number of layers L equals at least 60 or: $L(N^2-1) \geq 60$, whereby light rays incident thereon at between 0° to 45° and 70° to 90° will be almost totally reflected and light rays incident thereon between 40° and 70° will be refracted and substantially transmitted as radially polarized light, a reflector disposed adjacent the light source side of the layers having a reflectivity of at least 80% and a depolarizer between the reflector and layers for the reflected light.

References Cited in the file of this patent

UNITED STATES PATENTS

| | | |
|---|---|---|
| 2,252,898 | Pollack | Aug. 19, 1941 |
| 2,402,176 | Marks | June 18, 1946 |
| 2,403,731 | MacNeill | July 9, 1946 |
| 2,453,379 | Marks | Nov. 9, 1948 |
| 2,687,673 | Boone | Aug. 31, 1954 |
| 2,887,566 | Marks | May 19, 1959 |
| 2,982,178 | Marks | May 2, 1961 |
| 3,024,701 | Marks et al. | Mar. 13, 1962 |

FOREIGN PATENTS

| | | |
|---|---|---|
| 457,542 | Great Britain | Nov. 30, 1936 |
| 460,666 | Great Britain | Jan. 28, 1937 |

OTHER REFERENCES

Jenkins and White, Fundamentals of Optics, second edition, 1950, McGraw Hill Book Co. (New York), pages 489–492.